United States Patent
Xiao et al.

(10) Patent No.: US 9,602,256 B2
(45) Date of Patent: Mar. 21, 2017

(54) METHOD AND APPARATUS FOR MOBILE TERMINAL TO SWITCH BASE STATION

(71) Applicant: Huawei Technologies Co., Ltd., Shenzhen, Guangdong (CN)

(72) Inventors: Dengkun Xiao, Shenzhen (CN); Xuena Cao, Shenzhen (CN); Yuxiang Zhang, Shenzhen (CN); Liji Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 14/305,501

(22) Filed: Jun. 16, 2014

(65) Prior Publication Data

US 2014/0314013 A1 Oct. 23, 2014

Related U.S. Application Data

(63) Continuation of application No. PCT/CN2012/086747, filed on Dec. 17, 2012.

(30) Foreign Application Priority Data

Dec. 16, 2011 (CN) .......................... 2011 1 0424219

(51) Int. Cl.
H04L 5/00 (2006.01)
H04W 36/00 (2009.01)
(Continued)

(52) U.S. Cl.
CPC ....... H04L 5/0032 (2013.01); H04W 36/0072 (2013.01); H04W 72/0426 (2013.01); H04W 36/20 (2013.01)

(58) Field of Classification Search
CPC ............... H04L 5/0032; H04L 5/0035; H04W 36/0072; H04W 36/20; H04W 36/30; H04W 36/38; H04W 72/0426
See application file for complete search history.

(56) References Cited

U.S. PATENT DOCUMENTS

2006/0286985 A1 12/2006 Pedersen
2008/0125124 A1 5/2008 Craig
(Continued)

FOREIGN PATENT DOCUMENTS

CN 1997204 A 7/2007
CN 1997217 A 7/2007
(Continued)

OTHER PUBLICATIONS

"3rd Generation Partnership Project; Technical Specification Group Radio Access Network; Evolved Universal Terrestrial Radio Access Network (E-UTRA); X2 application protocol (X2AP) (Release 10)," 3GPP TS 36.423, V10.3.0, pp. 1-132, 3rd Generation Partnership Project, Valbonne, France (Sep. 2011).

*Primary Examiner* — Khoa Huynh
(74) *Attorney, Agent, or Firm* — Leydig, Voit & Mayer, Ltd.

(57) ABSTRACT

The present invention provides a method including receiving, by a terminal, a switching command is large. The method includes: acquiring designated channel resource information from channel resources used by a source base station; acquiring information of a relevant base station using a designated channel resource except the source base station; sending indication signaling to the relevant base station according to the information of the relevant base station, where the indication signaling carries the designated channel resource information, the indication signaling is used to instruct the relevant base station to stop using the designated channel resource when the mobile terminal switches to a target base station; sending a switching request message to the target base station; and sending the switching command to the mobile terminal through the designated channel resource.

19 Claims, 5 Drawing Sheets

(51) Int. Cl.
*H04W 72/04* (2009.01)
*H04W 36/20* (2009.01)

(56) References Cited

U.S. PATENT DOCUMENTS

| | | |
|---|---|---|
| 2010/0216472 A1 | 8/2010 | Youn et al. |
| 2010/0254344 A1 | 10/2010 | Wei et al. |
| 2011/0092209 A1 | 4/2011 | Gaal et al. |
| 2014/0038613 A1* | 2/2014 | Toskala ................ H04W 36/20 455/436 |

FOREIGN PATENT DOCUMENTS

| | | |
|---|---|---|
| CN | 101026860 A | 8/2007 |
| CN | 101933351 A | 12/2010 |
| EP | 2214436 A1 | 8/2010 |
| WO | 2008096240 A1 | 8/2008 |
| WO | 2012139624 A1 | 10/2012 |

* cited by examiner

METHOD AND APPARATUS FOR MOBILE TERMINAL TO SWITCH BASE STATION

CROSS-REFERENCE TO RELATED APPLICATION

This application is a continuation of International Patent Application No. PCT/CN2012/086747, filed on Dec. 17, 2012, which claims priority to Chinese Patent Application No. 201110424219.0, filed on Dec. 16, 2011, both of which are hereby incorporated by reference in their entireties.

TECHNICAL FIELD

The present invention relates to the field of communications technologies, and in particular, to a method and an apparatus for a mobile terminal to switch a base station.

BACKGROUND

In a cellular network, a cell usually has several neighboring cells. When a mobile terminal (for example, a User Equipment, or a terminal device) spans a boundary of a cell to reach another cell, the mobile terminal needs to switch a base station, so as to ensure normal communication.

After moving, the mobile terminal needs to switch from a source base station of a located area to a target base station of a target area, so as to ensure that the communication is not interrupted, and the mobile terminal implements switching mainly by executing a switching command sent by the source base station.

Specifically, when the mobile terminal performs switching, the source base station sends a switching request message to the target base station, where the switching request message carries an information parameter of the mobile terminal; the target base station returns a reply message to the source base station, where the reply message carries an information parameter of the target base station; the source base station sends a switching command to the mobile terminal, where the switching command carries the information parameter of the target base station; and the mobile terminal executes the switching command.

In a co-channel network, a co-channel base station exists. Therefore, when communicating with another device, the source base station may use a channel resource the same as the one used for sending the switching command to the mobile terminal, so that interference on the channel resource increases, the switching command cannot be sent to the mobile terminal in time by using the channel resource, and the mobile terminal cannot switch to the target base station in time, thereby resulting in interruption of the communication of the mobile terminal.

In order to solve the above problem, before the source base station sends the switching command to the mobile terminal, the target base station and a surrounding base station reserve a channel resource for the mobile terminal, and the channel resource is provided only for the source base station to send the switching command to the mobile terminal. That is to say, when the source base station sends the switching command to the mobile terminal by using the reserved channel resource, the target base station does not use the reserved channel resource to communicate with the source base station, thereby ensuring that interference does not exist when the source base station sends the switching command to the mobile terminal.

Specifically, after receiving the switching request message or another message sent by the source base station, the target base station and the surrounding base station are prohibited from using a resource block used for delivering the switching command, when the user performs switching.

During the process of implementing that the mobile terminal switches the base station, the inventor finds that the prior art has at least the following problem: the target base station reserves the channel resource for the mobile terminal to reduce interference on receiving, by the mobile terminal, the switching command, where only interference of the target base station on the receiving, by the mobile terminal, the switching command is reduced, but interference of another co-channel base station on the receiving, by the mobile terminal, the switching command is not reduced.

SUMMARY

Embodiments of the present invention provide a method and an apparatus for a mobile terminal to switch a base station, capable of solving a problem that interference of a co-channel base station on receiving, by a terminal, a switching command is large.

In order to achieve the objective, the embodiments of the present invention adopt the following technical solutions:

A method for a mobile terminal to switch a base station includes:

acquiring designated channel resource information from channel resources used by a source base station, where the designated channel resource information is used for the source base station to transmit a switching command to the mobile terminal;

acquiring information of a relevant base station using the designated channel resource except the source base station;

sending, according to the information of the relevant base station, indication signaling to the relevant base station, where the indication signaling carries the designated channel resource information, the indication signaling is used to instruct the relevant base station to stop using the designated channel resource when the mobile terminal switches to a target base station, and the indication signaling is load information indication, a resource state request, or radio resource state information correction;

sending a switching request message to the target base station, where the switching request message includes the designated channel resource information, and the switching request message is further used to instruct the target base station to stop using the designated channel resource when the mobile terminal performs switching; and sending the switching command to the mobile terminal through the designated channel resource.

An apparatus for a mobile terminal to switch a base station includes:

a first acquiring unit, configured to acquire designated channel resource information from channel resources used by a source base station, where the designated channel resource information is used for the source base station to transmit a switching command to the mobile terminal;

a second acquiring unit, configured to acquire information of a relevant base station using the designated channel resource except the source base station;

a first sending unit, configured to send, according to the information of the relevant base station, indication signaling to the relevant base station, where the indication signaling carries the designated channel resource information, the indication signaling is used to instruct the relevant base station to stop using the designated channel resource when the mobile terminal switches to a target base station, and the indication signaling is load information indication, a resource state request, or radio resource state information correction;

a second sending unit, configured to send a switching request message to the target base station, where the switching request message includes the designated channel resource information, and the switching request message is further used to instruct the target base station to stop using the designated channel resource when the mobile terminal performs switching; and a third sending unit, configured to send the switching command to the mobile terminal through the designated channel resource.

In the method and the apparatus for a mobile terminal to switch a base station according to the embodiments of the present invention, the designated channel resource information is acquired from the channel resources used by the source base station, where the designated channel resource information is used for the source base station to transmit the switching command to the mobile terminal; the information of the relevant base station using the designated channel resource except the source base station is acquired; according to the information of the relevant base station, the indication signaling is sent to the relevant base station, where the indication signaling carries the designated channel resource information, the indication signaling is used to instruct the relevant base station to stop using the designated channel resource when the mobile terminal switches to the target base station, and the indication signaling is the load information indication, the resource state request, or the radio resource state information correction; the switching request message is sent to the target base station, where the switching request message includes the designated channel resource information, and the switching request message is further used to instruct the target base station to stop using the designated channel resource when the mobile terminal performs switching; and the switching command is sent to the mobile terminal through the designated channel resource. By adding the designated channel resource information to information such as the load information indication, the resource state request, the radio resource state information correction, or the switching request message sent to the relevant base station or the target base station, the relevant base station or the target base station stops using the designated channel resource when the mobile terminal switches to the target base station, thereby solving a problem that interference of a co-channel base station on receiving, by the mobile terminal, the switching command is large.

BRIEF DESCRIPTION OF DRAWINGS

To illustrate the technical solutions according to the embodiments of the present invention more clearly, the following briefly introduces accompanying drawings required for describing the embodiments. Apparently, the accompanying drawings in the following description are only some embodiments of the present invention, and persons of ordinary skill in the art can derive other drawings from the accompanying drawings without creative efforts.

DESCRIPTION OF EMBODIMENTS

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
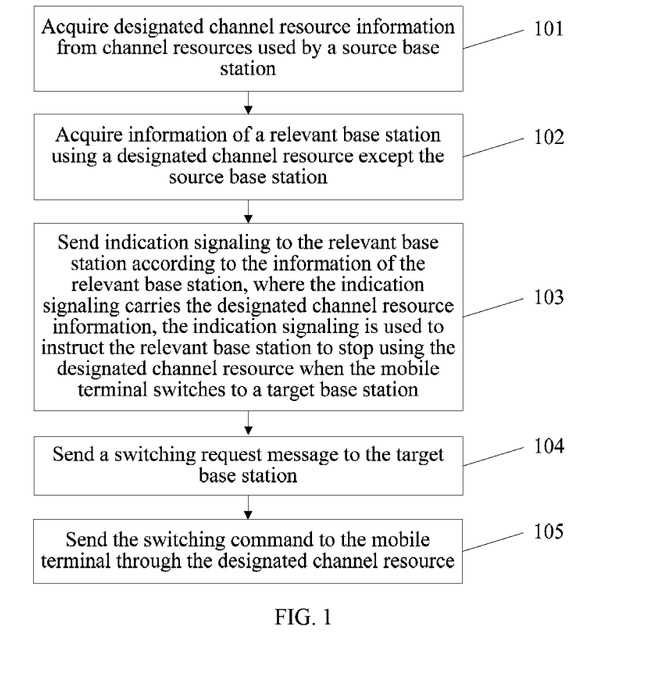
FIG. 1 is a flowchart of a method for a mobile terminal to switch a base station according to an embodiment of the present invention.

An embodiment of the present invention provides a method for a mobile terminal to switch a base station, as shown in FIG. 1, the method includes the following steps:

101: Acquire designated channel resource information from channel resources used by a source base station.

After moving from a cell where the source base station is located to a cell where a target base station is located, the mobile terminal needs to switch the base station, and the mobile terminal implements switching mainly by receiving a switching command sent by the source base station. The source base station needs to use a designated channel resource to send the switching command to the mobile terminal.

Therefore, before sending the switching command to the mobile terminal, the source base station needs to acquire the designated channel resource information, so as to use the designated channel resource corresponding to the designated channel resource information to send the switching command to the mobile terminal.

The designated channel resource information is used for the source base station to transmit the switching command to the mobile terminal.

102: Acquire information of a relevant base station using the designated channel resource except the source base station.

Some relevant base stations may perform communication by using the designated channel resource, and when the mobile terminal performs the switching, if a relevant base station still performs the communication by using the designated channel resource, interference exists when the switching command is transmitted by using the designated channel resource.

In order to reduce the interference of the relevant base station on the designated channel resource when the mobile terminal performs the switching, first, the source base station acquires, according to the designated channel resource, the information of the relevant base station using the designated channel resource except the source base station, so as to obtain the relevant base station corresponding to the information of the relevant base station.

As an implementation manner of this embodiment, the source base station sends relevant signaling to a base station in a preset scope, so as to acquire channel resource information used by the base station in the preset scope, thereby determining a base station that may use the designated channel resource to perform the communication in the preset scope as the relevant base station, when the source base station sends the switching command to the terminal by using the designated channel resource.

In this embodiment, a method for acquiring the relevant base station is not limited, and may be set according to actual demands, which is not described in detail here.

103: Send indication signaling to the relevant base station according to the information of the relevant base station.

The indication signaling carries the designated channel resource information, and the indication signaling is used to instruct the relevant base station to stop using the designated channel resource when the mobile terminal switches to the target base station.

The indication signaling includes, but is not limited to, any one of load information indication, a resource state request, and radio resource state information correction.

In order to enable the source base station to successfully send the switching command to the mobile terminal by using the designated channel resource, when the source base station sends the switching command to the mobile terminal, the relevant base station is made to stop using the designated channel resource when communicating with their respective users, so that the interference on the designated channel resource is reduced, and therefore, the source base station more quickly transfers the switching command to the mobile terminal by using the designated channel resource.

104: Send a switching request message to the target base station.

After moving, the mobile terminal needs to switch from the source base station of a located cell to the target base station of a target cell. Before the mobile terminal receives the switching command of the source base station, the source base station sends the switching request message to the target base station.

The switching request message includes relevant information of the mobile terminal, and the relevant information of the mobile terminal is a parameter used to perform the communication with the mobile terminal.

The switching request message further includes the designated channel resource information, and the switching request message is further used to instruct the target base station to stop using the designated channel resource when the mobile terminal performs the switching.

105: Send the switching command to the mobile terminal through the designated channel resource.

The mobile terminal needs to execute the switching command sent by the source base station to implement the switching of the base station. The switching command sent by the source base station to the mobile terminal carries the relevant information of the target base station, so that the mobile terminal switches from the source base station to the target base station according to the relevant information of the target base station and communicates with the target base station.

In the method for a mobile terminal to switch a base station according to this embodiment, the designated channel resource information is acquired from the channel resources used by the source base station, where the designated channel resource information is used for the source base station to transmit the switching command to the mobile terminal; the information of the relevant base station using the designated channel resource except the source base station is acquired; according to the information of the relevant base station, the indication signaling is sent to the relevant base station, where the indication signaling carries the designated channel resource information, the indication signaling is used to instruct the relevant base station to stop using the designated channel resource when the mobile terminal switches to the target base station, and the indication signaling is the load information indication, the resource state request, or the radio resource state information correction; the switching request message is sent to the target base station, where the switching request message includes the designated channel resource information, and the switching request message is further used to instruct the target base station to stop using the designated channel resource when the mobile terminal performs switching; and the switching command is sent to the mobile terminal through the designated channel resource. By adding the designated channel resource information to information such as the load information indication, the resource state request, the radio resource state information correction, or the switching request message sent to the relevant base station or the target base station, the relevant base station or the target base station stops using the designated channel resource when the mobile terminal switches to the target base station, thereby solving a problem that interference of a co-channel base station on receiving, by the mobile terminal, the switching command is large.

Figure 2:
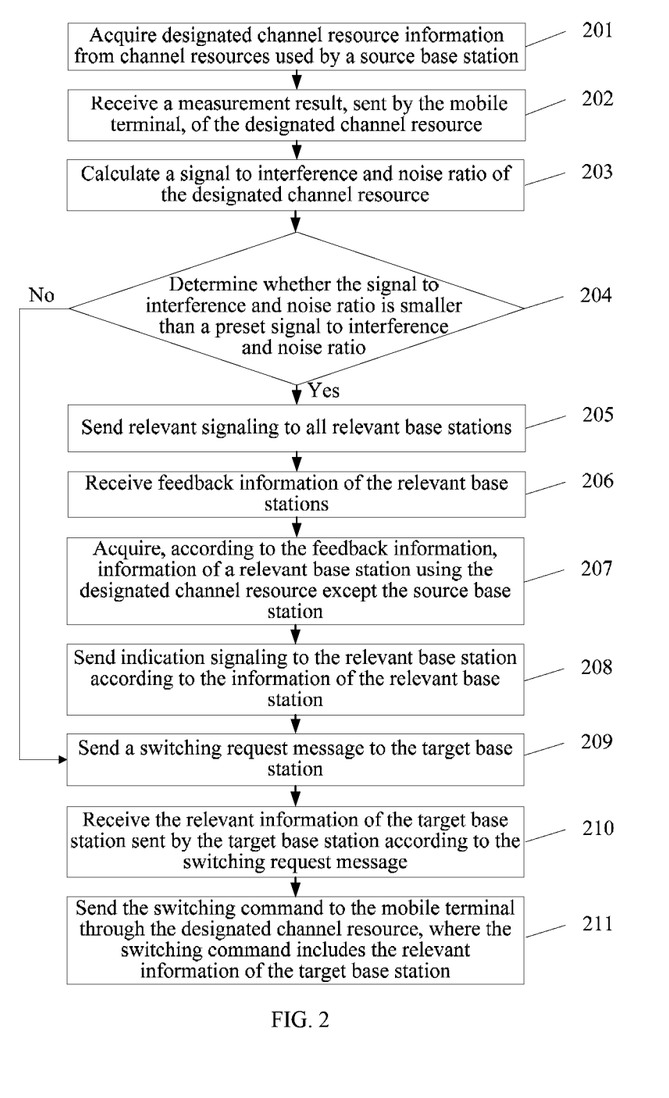
FIG. 2 is a flowchart of another method for a mobile terminal to switch a base station according to an embodiment of the present invention.

As an improvement of this embodiment, an embodiment of the present invention provides another method for a mobile terminal to switch a base station, as shown in FIG. 2, the method includes the following steps:

201: Acquire designated channel resource information from channel resources used by a source base station.

When performing switching, the mobile terminal implements the switching mainly by receiving a switching command sent by the source base station. The source base station needs to use a designated channel resource to send the switching command to the mobile terminal.

Figure 3:
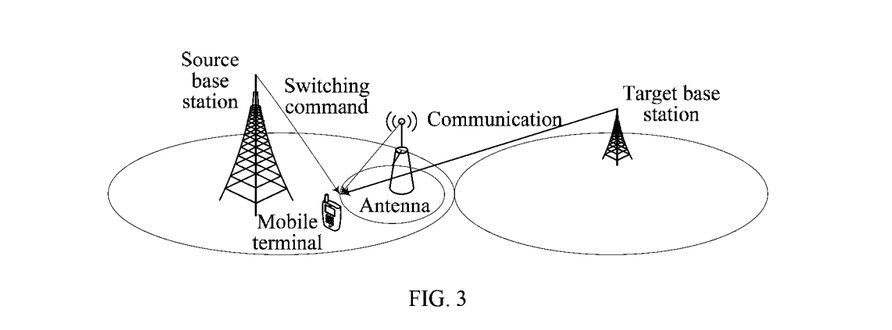
FIG. 3 is a scene graph of base stations and a mobile terminal according to an embodiment of the present invention.

Therefore, before sending the switching command to the mobile terminal, the source base station needs to acquire the designated channel resource information, so as to use the designated channel resource corresponding to the designated channel resource information to send the switching command to the mobile terminal. FIG. 3 is a deployment scene of the base stations and the mobile terminal.

The designated channel resource information is used for the source base station to transmit the switching command to the mobile terminal.

Further, alternatively, for the purpose of better ensuring successful transmission of the switching command, the designated channel resource is a channel resource with minimum interference or best channel quality in the channel resources used by the source base station.

202: Receive a measurement result, sent by the mobile terminal, of the designated channel resource.

The mobile terminal periodically measures the channel resources used by the source base station, and sends a measurement result to the source base station, where the measurement result includes the measurement result of the designated channel resource, and the measurement result of the designated channel resource includes, but is not limited to, at least one of channel quality, reference signal quality, and signal strength of the designated channel resource.

The source base station receives the measurement result, sent by the mobile terminal, of the designated channel resource.

203: Calculate a signal to interference and noise ratio of the designated channel resource.

Not only an interference degree of the designated channel resource affects a success ratio of transferring the switching command to the mobile terminal by the source base station, but also the signal to interference and noise ratio of the designated channel resource affects the success ratio of transferring the switching command to the mobile terminal by the source base station.

As an implementation manner of this embodiment, the signal to interference and noise ratio of the designated channel resource is calculated according to the measurement result of the designated channel resource, and it is determined, according to the signal to interference and noise ratio, whether the source base station can successfully send the switching command to the mobile terminal by using the designated channel resource.

204: Determine whether the signal to interference and noise ratio is smaller than a preset signal to interference and noise ratio.

The signal to interference and noise ratio of the designated channel resource affects the success ratio of sending the switching command to the mobile terminal by the source base station by using the designated channel resource, thereby affecting whether the mobile terminal can successfully execute the switching command. If the mobile terminal does not execute the switching command in time, that is, after moving, the mobile terminal does not switch from the source base station to the target base station in time, thereby resulting in interruption of the communication of the mobile terminal.

The greater the signal to interference and noise ratio of the designated channel resource is, the greater the success ratio of sending the switching command to the mobile terminal by the source base station by using the designated channel resource is; and the smaller the signal to interference and noise ratio of the designated channel resource is, the smaller the success ratio of sending the switching command to the mobile terminal by the source base station by using the designated channel resource is.

Specifically, the signal to interference and noise ratio of the designated channel resource is compared with the preset signal to interference and noise ratio. If the signal to interference and noise ratio is smaller than the preset signal to interference and noise ratio, it indicates that the source base station cannot successfully send the switching command to the mobile terminal by using the designated channel resource, and step 205 is executed; and if the signal to interference and noise ratio is not smaller than the preset signal to interference and noise ratio, it indicates that the source base station can successfully send the switching command to the mobile terminal by using the designated channel resource, and step 209 is executed.

A value of the preset signal to interference and noise ratio may be set according to demands, which is well known by persons skilled in the art, and is not described in detail here.

205: Send relevant signaling to all relevant base stations.

The relevant signaling is, but is not limited to, load information indication, a resource state request, or radio resource state information correction, and the relevant signaling includes, but is not limited to, an uplink channel resource, a downlink channel resource, and the designated channel resource used by the current source base station.

The source base station sends the relevant signaling to all the relevant base stations and notifies the relevant base stations of the designated channel resource information, so that the mobile terminal obtains the situation that the relevant base stations use the designated channel resource.

206: Receive feedback information of the relevant base stations.

After receiving the relevant information, the relevant base stations send the feedback information to the source base station, where the feedback information includes whether the relevant base stations perform the communication by using the designated channel resource.

207: Acquire, according to the feedback information, information of a relevant base station using the designated channel resource except the source base station.

After the source base station acquires the designated channel resource, the relevant base station performing the communication by using the designated channel resource except the source base station is acquired according to the feedback information.

208: Send indication signaling to the relevant base station according to the information of the relevant base station.

In order to enable the source base station to successfully transfer the switching command to the mobile terminal by using first resource information, when the source base station sends the switching command to the mobile terminal, the relevant base station is made to stop using the designated channel resource, so that interference generated due to that the relevant base station performs the communication by using the designated channel resource is reduced, and therefore the success ratio of transferring the switching command to the mobile terminal by the source base station by using the designated channel resource is improved.

Specifically, the source base station sends the indication signaling to the relevant base station according to the information of the relevant base station, where the indication signaling carries the designated channel resource information, and the indication signaling is used to instruct the relevant base station to stop using the designated channel resource when the mobile terminal switches to the target base station. The indication signaling is, but is not limited to, the load information indication, the resource state request, or the radio resource state information correction.

209: Send a switching request message to the target base station.

After moving, the mobile terminal needs to switch from the source base station of a located cell to the target base station of a target cell. Before the mobile terminal receives the switching command of the source base station, the source base station sends the switching request message to the target base station.

The switching request message carries relevant information of the mobile terminal, so that the target base station establishes the communication with the mobile terminal according to the relevant information of the mobile terminal.

The switching request message further includes the designated channel resource information, and the switching request message is further used to instruct the target base station to stop using the designated channel resource when the mobile terminal performs the switching.

210: Receive the relevant information of the target base station sent by the target base station according to the switching request message.

After receiving the switching request message sent by the source base station, the target base station sends reply information to the source base station, where the reply information carries the relevant information of the target base station. The relevant information of the target base station is a parameter used to perform the communication with the target base station.

211: Send the switching command to the mobile terminal through the designated channel resource information, where the switching command includes the relevant information of the target base station.

The mobile terminal needs to execute the switching command sent by the source base station to implement the communication. The switching command sent by the source base station to the mobile terminal carries the relevant information of the target base station, so that the mobile terminal establishes the communication with the target base station according to the relevant information of the target base station.

Figure 4:
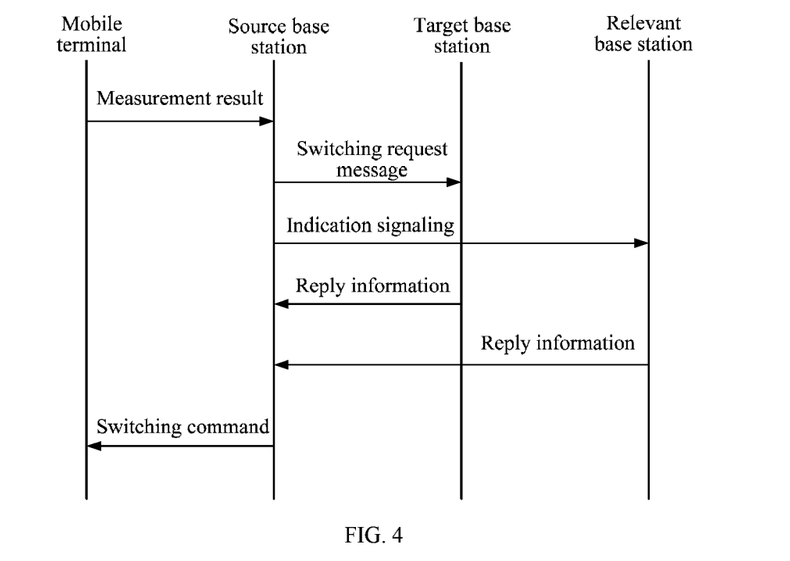
FIG. 4 is a schematic diagram of a method for a mobile terminal to switch a base station by adopting a method for sending a measurement result to a source base station by the mobile terminal according to an embodiment of the present invention.

As shown in FIG. 4, it is a schematic diagram of a method for a mobile terminal to switch a base station by adopting a method for sending a measurement result to a source base station by the mobile terminal.

In the method for a mobile terminal to switch a base station according to this embodiment, designated channel resource information is acquired from channel resources used by the source base station, where the designated channel resource information is used for the source base station to transmit a switching command to the mobile terminal; information of a relevant base station using a designated channel resource except the source base station is acquired; according to the information of the relevant base station, indication signaling is sent to the relevant base station, where the indication signaling carries the designated channel resource information, the indication signaling is used to instruct the relevant base station to stop using the designated channel resource when the mobile terminal switches to a target base station, and the indication signaling is load information indication, a resource state request, or radio resource state information correction; a switching request message is sent to the target base station, where the switching request message includes the designated channel resource information, and the switching request message is further used to instruct the target base station to stop using the designated channel resource when the mobile terminal performs switching; relevant information of the target base station sent by the target base station according to the switching request message is received; and the switching command is sent to the mobile terminal through the designated channel resource, where the switching command includes the relevant information of the target base station. By adding the designated channel resource information to information such as the load information indication, the resource state request, the radio resource state information correction, or the switching request message sent to the relevant base station or the target base station, the relevant base station or the target base station stops using the designated channel resource when the mobile terminal switches to the target base station, thereby solving a problem that interference of a co-channel base station on receiving, by the mobile terminal, the switching command is large.

Figure 5:
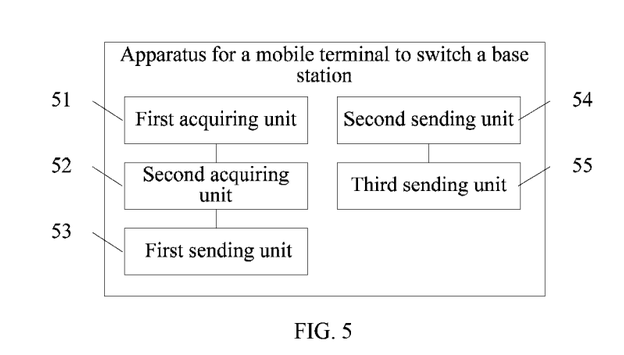
FIG. 5 is a schematic structural diagram of an apparatus for a mobile terminal to switch a base station according to an embodiment of the present invention.

An embodiment of the present invention provides an apparatus for a mobile terminal to switch a base station, configured to execute the method provided by each embodiment of the present invention. Therefore, the description of the method provided by each embodiment of the present invention is also applicable to each apparatus provided by the following embodiments. As shown in FIG. 5, the apparatus of this embodiment includes a first acquiring unit 51, a second acquiring unit 52, a first sending unit 53, a second sending unit 54, and a third sending unit 55.

The first acquiring unit 51 is configured to acquire designated channel resource information from channel resources used by a source base station, where the designated channel resource information is used for the source base station to transmit a switching command to the mobile terminal.

The second acquiring unit 52 is configured to acquire information of a relevant base station using a designated channel resource except the source base station.

The first sending unit 53 is configured to send indication signaling to the relevant base station according to the information of the relevant base station, where the indication signaling carries the designated channel resource information, the indication signaling is used to instruct the relevant base station to stop using the designated channel resource when the mobile terminal switches to a target base station, and the indication signaling is, but is not limited to, load information indication, a resource state request, or radio resource state information correction.

The second sending unit 54 is configured to send a switching request message to the target base station, where the switching request message includes the designated channel resource information, and the switching request message is further used to instruct the target base station to stop using the designated channel resource when the mobile terminal performs switching.

The third sending unit 55 is configured to send the switching command to the mobile terminal through the designated channel resource.

In the apparatus for a mobile terminal to switch a base station according to this embodiment, the designated channel resource information is acquired from the channel resources used by the source base station, where the designated channel resource information is used for the source base station to transmit the switching command to the mobile terminal; the information of the relevant base station using the designated channel resource except the source base station is acquired; according to the information of the relevant base station, the indication signaling is sent to the relevant base station, where the indication signaling carries the designated channel resource information, the indication signaling is used to instruct the relevant base station to stop using the designated channel resource when the mobile terminal switches to the target base station, and the indication signaling is the load information indication, the resource state request, or the radio resource state information correction; the switching request message is sent to the target base station, where the switching request message includes the designated channel resource information, and the switching request message is further used to instruct the target base station to stop using the designated channel resource when the mobile terminal performs switching; and the switching command is sent to the mobile terminal through the designated channel resource. By adding the designated channel resource information to information such as the load information indication, the resource state request, the radio resource state information correction, or the switching request message sent to the relevant base station or the target base station, the relevant base station or the target base station stops using the designated channel resource when the mobile terminal switches to the target base station, thereby solving a problem that interference of a co-channel base station on receiving, by the mobile terminal, the switching command is large.

Figure 6:
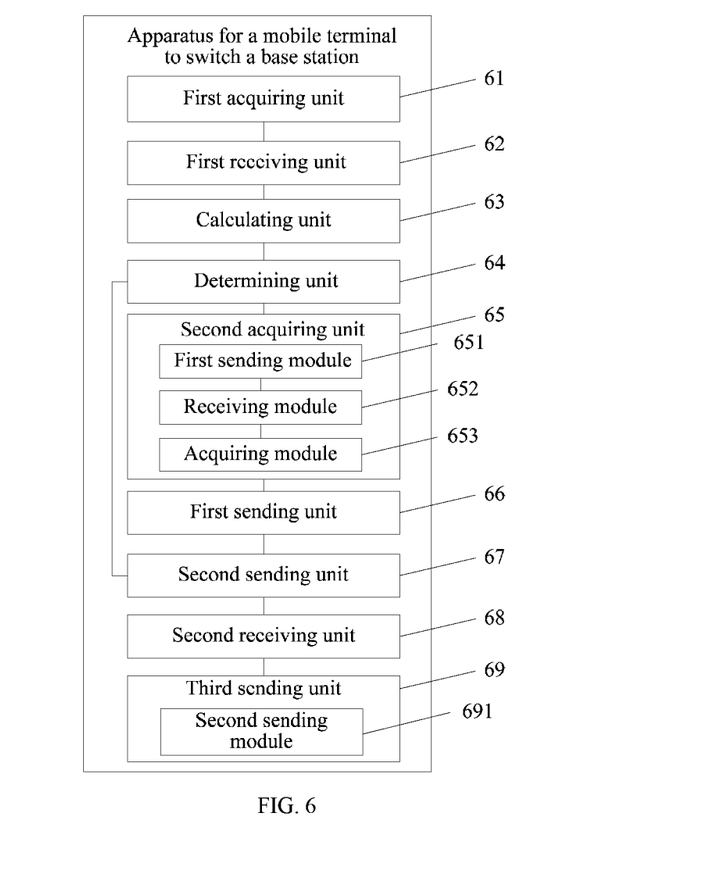
FIG. 6 is a schematic structural diagram of another apparatus for a mobile terminal to switch a base station according to an embodiment of the present invention.

As an improvement of this embodiment, an embodiment of the present invention provides an apparatus for a mobile terminal to switch a base station, as shown in FIG. 6, the apparatus includes a first acquiring unit 61, a first receiving unit 62, a calculating unit 63, a determining unit 64, a second acquiring unit 65, a first sending unit 66, a second sending unit 67, a second receiving unit 68, and a third sending unit 69.

The second acquiring unit 65 includes a first sending module 651, a receiving module 652, and an acquiring module 653.

The third sending unit 69 includes a second sending module 691.

The first acquiring unit 61 is configured to acquire designated channel resource information from channel resources used by a source base station, where the designated channel resource information is used for the source base station to transmit a switching command to the mobile terminal.

When performing switching, the mobile terminal implements the switching mainly by receiving the switching command sent by the source base station. The source base station needs to use a certain channel resource to send the switching command to the mobile terminal.

Therefore, before the source base station sends the switching command to the mobile terminal, the first acquiring unit needs to acquire the designated channel resource information, so as to use a designated channel resource corresponding to the designated channel resource information to send the switching command to the mobile terminal.

Further, alternatively, for the purpose of better ensuring successful transmission of the switching command, the designated channel resource is a channel resource with minimum interference or best channel quality in the channel resources used by the source base station.

The first receiving unit 62 is configured to receive a measurement result, sent by the mobile terminal, of the designated channel resource.

The measurement result includes, but is not limited to, at least one of channel quality, reference signal quality, and signal strength of the designated channel resource.

The mobile terminal periodically measures the channel resources used by the source base station, and sends a measurement result to the source base station, where the measurement result includes the measurement result of the designated channel resource, and the first receiving unit receives the measurement result sent by the mobile terminal. The measurement result includes the measurement result of the designated channel resource, and the measurement result of the designated channel resource includes, but is not limited to, at least one of channel quality, reference signal quality, and signal strength of the designated channel resource.

The calculating unit 63 is configured to calculate a signal to interference and noise ratio of the designated channel resource.

When performing the communication by using the designated channel resource, the base station or the mobile terminal may generate interference on the communication. The larger the generated interference is, the lower a success ratio of transferring the switching command to the mobile terminal by the source base station is; and the smaller the generated interference is, the higher the success ratio of transferring the switching command to the mobile terminal by the source base station is.

Not only an interference degree of the designated channel resource affects the success ratio of transferring the switching command to the mobile terminal by the source base station, but also the signal to interference and noise ratio of the designated channel resource affects the success ratio of transferring the switching command to the mobile terminal by the source base station.

As an implementation manner of this embodiment, the calculating unit calculates the signal to interference and noise ratio of the designated channel resource according to the measurement result of the designated channel resource and determines, according to the signal to interference and noise ratio, whether the source base station can successfully send the switching command to the mobile terminal by using the designated channel resource.

The determining unit 64 is configured to determine whether the signal to interference and noise ratio is smaller than a preset signal to interference and noise ratio.

The determining unit compares the signal to interference and noise ratio of the designated channel resource with the preset signal to interference and noise ratio, so as to determine whether the signal to interference and noise ratio is smaller than the preset signal to interference and noise ratio.

If the signal to interference and noise ratio is smaller than the preset signal to interference and noise ratio, it indicates that the source base station cannot successfully send the switching command to the mobile terminal by using the designated channel resource; and if the signal to interference and noise ratio is not smaller than the preset signal to interference and noise ratio, it indicates that the source base station can successfully send the switching command to the mobile terminal by using the designated channel resource.

A value of the preset signal to interference and noise ratio may be set according to demands, which is well known by persons skilled in the art, and is not described in detail here.

The second acquiring unit 65 is configured to acquire information of a relevant base station using the designated channel resource except the source base station.

After the source base station acquires the designated channel resource, the second acquiring unit acquires, according to the designated channel resource, the relevant base station performing the communication by using the designated channel resource except the source base station.

Specifically, the first sending module 651 is configured to send relevant signaling to all relevant base stations. The relevant signaling is, but is not limited to, load information indication, a resource state request, or radio resource state information correction, and the relevant signaling includes an uplink channel resource, a downlink channel resource, and the designated channel resource used by the current source base station.

The receiving module 652 is configured to receive feedback information of the relevant base stations, where the feedback information includes whether the relevant base stations use the designated channel resource.

The acquiring module 653 is configured to acquire, according to the feedback information, information of a relevant base station using the designated channel resource except the source base station.

The first sending unit 66 is configured to send indication signaling to the relevant base station according to the information of the relevant base station. The indication signaling carries the designated channel resource information, and the indication signaling is used to instruct the relevant base station to stop using the designated channel resource when the mobile terminal switches to the target base station.

In order to enable the source base station to successfully transfer the switching command to the mobile terminal by using first resource information, when the source base station sends the switching command to the mobile terminal, the relevant base station is made to stop using the designated channel resource, so that interference generated due to that the relevant base station performs the communication by using the designated channel resource is reduced, and therefore the success ratio of transferring the switching command to the mobile terminal by the source base station by using the designated channel resource is improved.

The first sending unit sends the indication signaling to the relevant base station according to the information of the relevant base station, where the indication signaling carries the designated channel resource information, and the indication signaling is used to instruct the relevant base station to stop using the designated channel resource when the mobile terminal switches to the target base station.

The indication signaling is, but is not limited to, the load information indication, the resource state request, or the radio resource state information correction.

The second sending unit 67 is configured to send a switching request message to the target base station.

After moving, the mobile terminal needs to switch from the source base station of a located cell to the target base station of a target cell. Before the mobile terminal receives the switching command of the source base station, the second sending unit sends the switching request message to the target base station.

The switching request message carries relevant information of the mobile terminal, so that the target base station establishes the communication with the mobile terminal according to the relevant information of the mobile terminal.

The switching request message further includes the designated channel resource information, and the switching request message is further used to instruct the target base station to stop using the designated channel resource when the mobile terminal performs the switching.

The second receiving unit 68 is configured to receive the relevant information of the target base station sent by the target base station according to the switching request message.

After receiving the switching request message sent by the source base station, the second receiving unit sends reply information to the source base station, and the receiving unit receives the relevant information of the target base station sent by the target base station according to the switching request message.

The reply information carries the relevant information of the target base station. The relevant information of the target base station is a parameter used to perform the communication with the target base station.

The third sending unit 69 is configured to send the switching command to the mobile terminal through the designated channel resource information.

The mobile terminal needs to execute the switching command sent by the source base station to implement the communication. The switching command sent by the third sending unit to the mobile terminal carries the relevant information of the target base station, so that the mobile terminal establishes the communication with the target base station according to the relevant information of the target base station.

Specifically, the second sending module 691 is configured to send the switching command to the mobile terminal through the designated channel resource, where the switching command includes the relevant information of the target base station.

In the apparatus for a mobile terminal to switch a base station according to this embodiment, the designated channel resource information is acquired from the channel resources used by the source base station, where the designated channel resource information is used for the source base station to transmit the switching command to the mobile terminal; the information of the relevant base station using the designated channel resource except the source base station is acquired; according to the information of the relevant base station, the indication signaling is sent to the relevant base station, where the indication signaling carries the designated channel resource information, the indication signaling is used to instruct the relevant base station to stop using the designated channel resource when the mobile terminal switches to the target base station, and the indication signaling is the load information indication, the resource state request, or the radio resource state information correction; the switching request message is sent to the target base station, where the switching request message includes the designated channel resource information, and the switching request message is further used to instruct the target base station to stop using the designated channel resource when the mobile terminal performs switching; the relevant information of the target base station sent by the target base station according to the switching request message is received; and the switching command is sent to the mobile terminal through the designated channel resource, where the switching command includes the relevant information of the target base station. By adding the designated channel resource information to information such as the load information indication, the resource state request, the radio resource state information correction, or the switching request message sent to the relevant base station or the target base station, the relevant base station or the target base station stops using the designated channel resource when the mobile terminal switches to the target base station, thereby solving a problem that interference of a co-channel base station on receiving, by the mobile terminal, the switching command is large.

Through the foregoing description of the embodiments, it is apparent to persons skilled in the art that the present invention may be accomplished by software plus necessary universal hardware, and definitely may also be accomplished by hardware, but in most cases, the present invention is preferably implemented through the former method. Based on this, the technical solutions of the present invention or the part that makes contributions to the prior art can be substantially embodied in the form of a software product. The computer software product is stored in a readable storage medium, for example, a floppy disk, hard disk, or optical disk of the computer, and contains several instructions used to instruct a computer device (for example, a personal computer, a server, or a network device) to perform the methods according to the embodiments of the present invention.

The foregoing descriptions are merely several embodiments of the present invention, but not intended to limit the present invention. Any variation or replacement readily figured out by a person skilled in the art within the technical scope disclosed in the present invention shall fall within the protection scope of the present invention. Therefore, the protection scope of the present invention is subject to the appended claims.

What is claimed is:

1. A method for a mobile terminal to switch from a source base station to a target base station, comprising:
    acquiring designated channel resource information from channel resources used by a source base station, wherein the designated channel resource information is used for the source base station to transmit a switching command to the mobile terminal;
    calculating a signal to interference and noise ratio of a designated channel resource;

determining whether the signal to interference and noise ratio is smaller than a preset signal to interference and noise ratio;

when the signal to interference and noise ratio is smaller than the preset signal to interference and noise ratio, acquiring information of a relevant base station, which uses the designated channel resource, wherein the relevant base station is neither the source base station nor the target base station;

sending indication signaling to the relevant base station according to the information of the relevant base station, wherein the indication signaling carries the designated channel resource information, the indication signaling is used to instruct the relevant base station to stop using the designated channel resource when the mobile terminal switches to the target base station, and the indication signaling is one of the following: load information indication, a resource state request, and radio resource state information correction;

sending a switching request message to the target base station, wherein the switching request message comprises the designated channel resource information, and the switching request message is further used to instruct the target base station to stop using the designated channel resource when the mobile terminal performs switching; and sending the switching command to the mobile terminal through the designated channel resource.

2. The method according to claim 1, wherein the acquiring the information of the relevant base station using the designated channel resource comprises:

sending relevant signaling to a plurality of relevant base stations, wherein the relevant signaling is one of the following: load information indication, a resource state request, and radio resource state information correction, and the relevant signaling comprises an uplink channel resource, a downlink channel resource, and the designated channel resource used by the source base station;

receiving feedback information of the relevant base stations, wherein the feedback information comprises whether the relevant base stations use the designated channel resource; and acquiring, according to the feedback information, the information of the relevant base station using the designated channel resource except the source baso station.

3. The method according to claim 1, wherein before the calculating the signal to interference and noise ratio of the designated channel resource, the method further comprises:

receiving a measurement result, sent by the mobile terminal, of the designated channel resource, wherein the measurement result comprises at least one of channel quality, reference signal quality, and signal strength of the designated channel resource, wherein the calculating the signal to interference and noise ratio of the designated channel resource is: calculating the signal to interference and noise ratio of the designated channel resource according to the measurement result of the designated channel resource.

4. The method according to claim 1, wherein the designated channel resource is a channel resource with minimum interference or best channel quality in the channel resources used by the source base station.

5. The method according to claim 1, wherein after the sending the switching request message to the target base station, the method further comprises:

receiving relevant information of the target base station sent by the target base station according to the switching request message;

the sending the switching command to the mobile terminal through the designated channel resource comprises:

sending the switching command to the mobile terminal through the designated channel resource, wherein the switching command comprises the relevant information of the target base station.

6. A non transitory computer-readable storage medium, containing software instructions that when executed by a computer device, cause the computer device to:

acquire designated channel resource information from channel resources used by a source base station, wherein the designated channel resource information is used for the source base station to transmit a switching command to the mobile terminal;

calculate a signal to interference and noise ratio of a designated channel resource;

determine whether the signal to interference and noise ratio is smaller than a preset signal to interference and noise ratio;

when the signal to interference and noise ratio is smaller than the preset signal to interference and noise ratio, acquire information of a relevant base station, which uses the designated channel resource, wherein the relevant base station is neither the source base station nor a target base station;

send indication signaling to the relevant base station according to the information of the relevant base station, wherein the indication signaling carries the designated channel resource information, the indication signaling is used to instruct the relevant base station to stop using the designated channel resource when the mobile terminal switches to the target base station, and the indication signaling is one of the following: load information indication, a resource state request, and radio resource state information correction;

send a switching request message to the target base station, wherein the switching request message comprises the designated channel resource information, and the switching request message is further used to instruct the target base station to stop using the designated channel resource when the mobile terminal performs switching; and send the switching command to the mobile terminal through the designated channel resource.

7. The non-transitory computer-readable storage medium according to claim 6, wherein the software instructions further cause the computer device to:

send relevant signaling to a plurality of relevant base stations, wherein the relevant signaling is one of the following: load information indication, a resource state request, and radio resource state information correction, and the relevant signaling comprises an uplink channel resource, a downlink channel resource, and the designated channel resource used by the current source base station;

receive feedback information of the relevant base stations, wherein the feedback information comprises whether the relevant base stations use the designated channel resource; and acquire, according to the feedback information, the information of the relevant base station using the designated channel resource.

8. The non-transitory computer-readable storage medium according to claim 6, wherein the software instructions further cause the computer device to:
receive a measurement result, sent by the mobile terminal, of the designated channel resource, wherein the measurement result comprises at least one of channel quality, reference signal quality, and signal strength of the designated channel resource,
calculate the signal to interference and noise ratio of the designated channel resource according to the measurement result of the designated channel resource.

9. The non-transitory computer-readable storage medium according to claim 6, wherein the designated channel resource is a channel resource with minimum interference or best channel quality in the channel resources used by the source base station.

10. The non-transitory computer-readable storage medium according to claim 6, wherein the software instructions further cause the computer device to:
receive relevant information of the target base station sent by the target base station according to the switching request message, and
send the switching command to the mobile terminal through the designated channel resource, wherein the switching command comprises the relevant information of the target base station.

11. A method for a mobile terminal to switch from a source base station to a target base station, comprising:
acquiring designated channel resource information from channel resources used by a source base station;
calculating a signal to interference and noise ratio of a designated channel resource;
determining whether the signal to interference and noise ratio is smaller than a preset signal to interference and noise ratio;
when the signal to interference and noise ratio is smaller than the preset signal to interference and noise ratio, acquiring information of a relevant base station, which uses the designated channel resource, wherein the relevant base station is neither the source base station nor the target base station;
instructing the relevant base station and the target base station to stop using the designated channel resource when the mobile terminal switches to the target base station; and
sending a switching command to the mobile terminal through the designated channel resource.

12. The method according to claim 11, wherein the designated channel resource information is used for the source base station to transmit the switching command to the mobile terminal.

13. The method according to claim 11, wherein the instructing the relevant base station and the target base station to stop using the designated channel resource further comprises:
sending indication signaling to the relevant base station according to the information of the relevant base station, to instruct the relevant base station to stop using the designated channel resource when the mobile terminal switches to the target base station; and
sending a switching request message to the target base station, to instruct the target base station to stop using the designated channel resource when the mobile terminal performs switching.

14. The method according to claim 13, wherein both the indication signaling and the switching request message carry the designated channel resource information.

15. The method according to claim 11, wherein the indication signaling is one of the following: load information indication, a resource state request, and radio resource state information correction.

16. The method according to claim 11, wherein the acquiring the information of the relevant base station using the designated channel resource comprises:
sending relevant signaling to a plurality of relevant base stations, wherein the relevant signaling is one of the following: load information indication, a resource state request, and radio resource state information correction, and the relevant signaling comprises an uplink channel resource, a downlink channel resource, and the designated channel resource used by the source base station;
receiving feedback information of the relevant base stations, wherein the feedback information comprises whether the relevant base stations use the designated channel resource; and
acquiring, according to the feedback information, the information of the relevant base station using the designated channel resource.

17. The method according to claim 11, wherein before the calculating the signal to interference and noise ratio of the designated channel resource, the method further comprises:
receiving a measurement result, sent by the mobile terminal, of the designated channel resource, wherein the measurement result comprises at least one of channel quality, reference signal quality, and signal strength of the designated channel resource, wherein
the calculating the signal to interference and noise ratio of the designated channel resource is: calculating the signal to interference and noise ratio of the designated channel resource according to the measurement result of the designated channel resource.

18. The method according to claim 11, wherein the designated channel resource is a channel resource with minimum interference or best channel quality in the channel resources used by the source base station.

19. The method according to claim 13, wherein after the sending the switching request message to the target base station, the method further comprises:
receiving relevant information of the target base station sent by the target base station according to the switching request message; and
the sending the switching command to the mobile terminal through the designated channel resource comprises:
sending the switching command to the mobile terminal through the designated channel resource, wherein the switching command comprises the relevant information of the target base station.

* * * * *